United States Patent
Hashimoto et al.

(10) Patent No.: US 12,503,406 B2
(45) Date of Patent: Dec. 23, 2025

(54) POROUS CERAMICS AND METHOD FOR PRODUCING POROUS CERAMICS

(71) Applicants: CHIBA INSTITUTE OF TECHNOLOGY, Chiba (JP); DAIO PAPER CORPORATION, Ehime (JP)

(72) Inventors: Kazuaki Hashimoto, Chiba (JP); Junya Okawa, Ehime (JP); Hiroto Sasaki, Ehime (JP)

(73) Assignees: CHIBA INSTITUTE OF TECHNOLOGY, Chiba (JP); DAIO PAPER CORPORATION, Ehime (JP)

( * ) Notice: Subject to any disclaimer, the term of this patent is extended or adjusted under 35 U.S.C. 154(b) by 1041 days.

(21) Appl. No.: 17/607,568

(22) PCT Filed: Jun. 2, 2020

(86) PCT No.: PCT/JP2020/021717
§ 371 (c)(1),
(2) Date: Oct. 29, 2021

(87) PCT Pub. No.: WO2020/246451
PCT Pub. Date: Dec. 10, 2020

(65) Prior Publication Data
US 2022/0220038 A1    Jul. 14, 2022

(30) Foreign Application Priority Data
Jun. 4, 2019    (JP) ................. 2019-104303

(51) Int. Cl.
*C04B 38/00*    (2006.01)
*C04B 35/447*   (2006.01)
(Continued)

(52) U.S. Cl.
CPC ........ *C04B 38/0054* (2013.01); *C04B 35/447* (2013.01); *C04B 38/0058* (2013.01);
(Continued)

(58) Field of Classification Search
None
See application file for complete search history.

(56) References Cited

U.S. PATENT DOCUMENTS

2004/0057939 A1    3/2004  Hakamazuka et al.
2021/0162096 A1*   6/2021  Viana Ferreira ........ A61L 27/54

FOREIGN PATENT DOCUMENTS

JP    63-40782     2/1988
JP    H5-208877    8/1993
(Continued)

OTHER PUBLICATIONS

Changlu Xu et al, "A versatile three-dimentional form fabrication strategy for soft and hard tissue engineering." Biomedical Materials 13 (2008) 025018. Available online at https://doi.org/10.1088/1748-605X/aaa1f6, published Feb. 8, 2018.
(Continued)

*Primary Examiner* — Jacob T Minskey
*Assistant Examiner* — Adrien J Bernard
(74) *Attorney, Agent, or Firm* — Andrus Intellectual Property Law, LLP

(57) ABSTRACT

Porous ceramics that meet the demand for bone substitute materials and the like are provided. Solution is provided by porous ceramics and a method for producing the porous ceramics, which are ceramics having pores, the pores including open pores and closed pores, the open pores including a plurality of large-diameter open pores having a pore size within a range of 20 to 600 μm and a plurality of micro-diameter open pores having a pore size within a range of 1.0 μm or smaller, wherein the large-diameter open pores are distributed substantially uniformly all over the ceramics.

2 Claims, 16 Drawing Sheets

(51) Int. Cl.
  *C04B 38/06* (2006.01)
  *C04B 38/10* (2006.01)
  *C04B 103/42* (2006.01)
  *C04B 111/00* (2006.01)

(52) U.S. Cl.
  CPC ...... *C04B 38/0061* (2013.01); *C04B 38/0675* (2013.01); *C04B 38/10* (2013.01); *C04B 2103/42* (2013.01); *C04B 2111/00836* (2013.01)

(56) References Cited

FOREIGN PATENT DOCUMENTS

| | | |
|---|---|---|
| JP | 2000-290083 | 10/2000 |
| JP | 2002-282285 | 10/2002 |
| JP | 2005-239471 | 9/2005 |
| JP | 2013-184878 | 9/2013 |
| JP | 2018-083742 | 5/2018 |

OTHER PUBLICATIONS

Mao et al, "Porous ceramics with tri-model pores prepared by forming and starch consolidation." Ceramics International 34 (2008) 107-112. Available online at www.sciencedirect.com, published Oct. 2, 2006.

Zhao Zhen Kai, "Sintered Brick Manufacturing Technology in a Single Step", p. 7, China Building Materials Industry Publishing House, Nov. 2012.

International Search Report for PCT/JP2020/021717, dated Aug. 11, 2020.

* cited by examiner

[FIG.1]
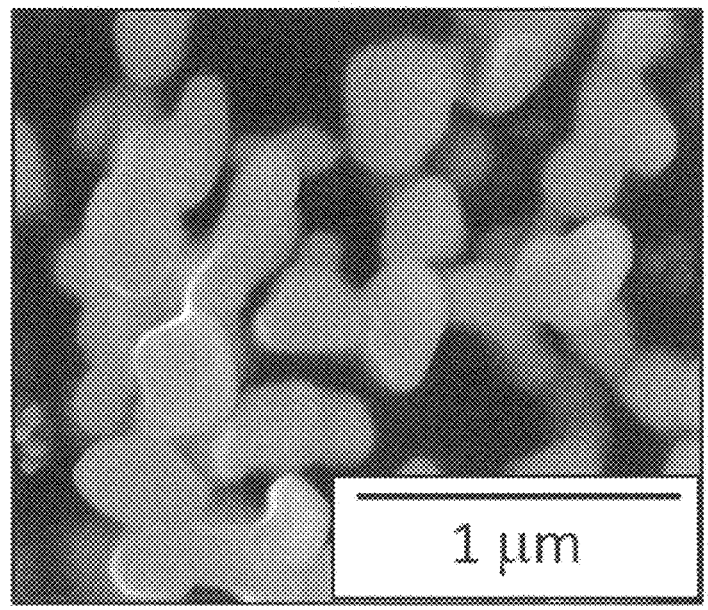

[FIG.2]
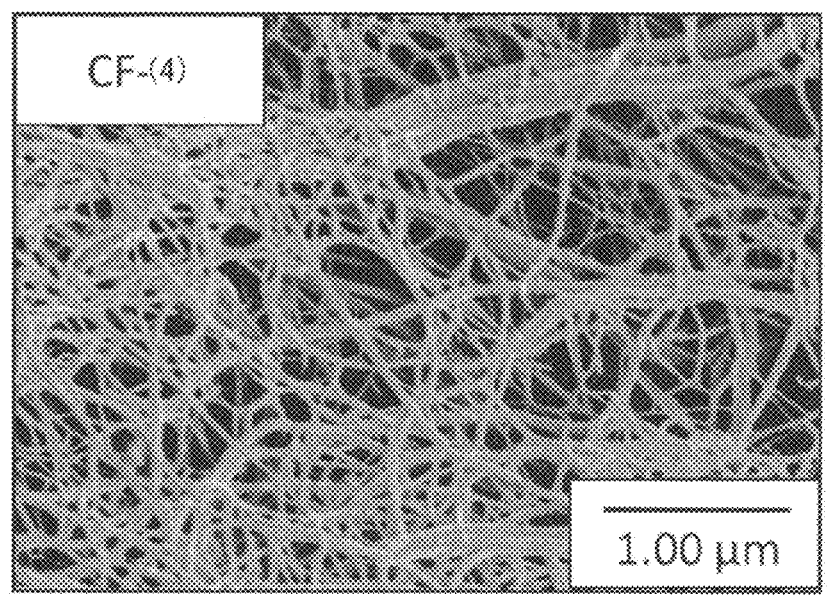

[FIG.3]
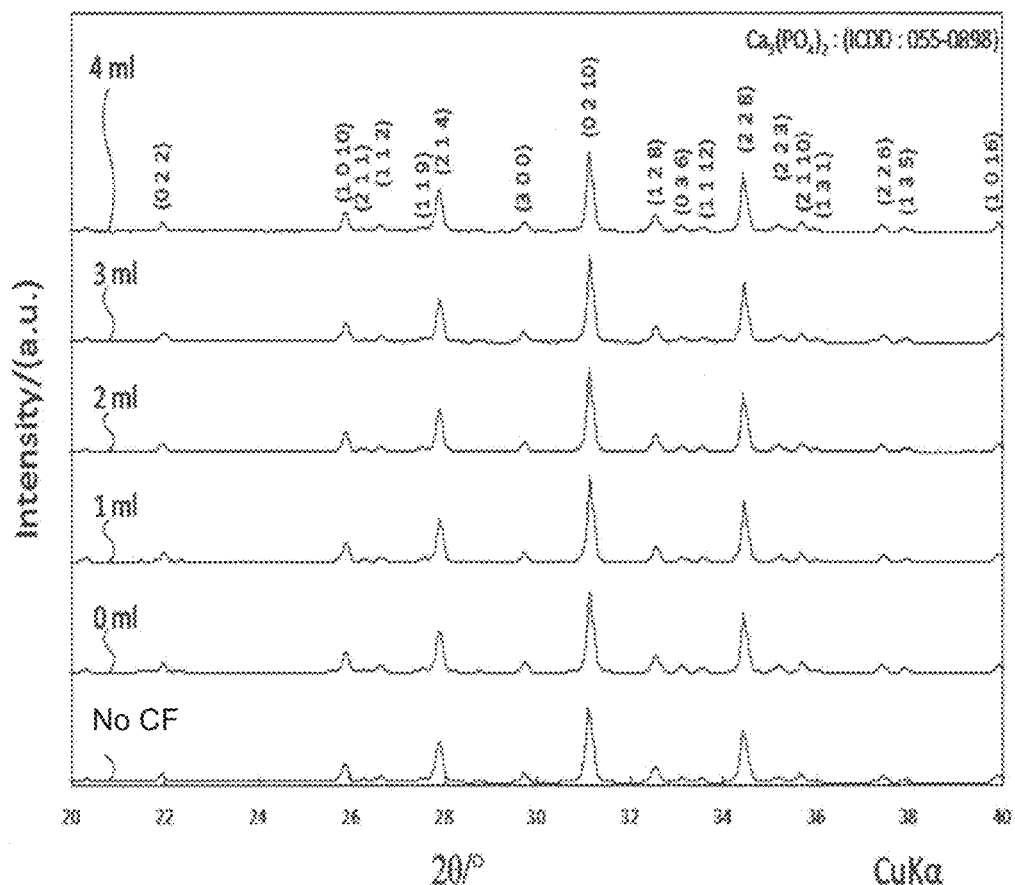

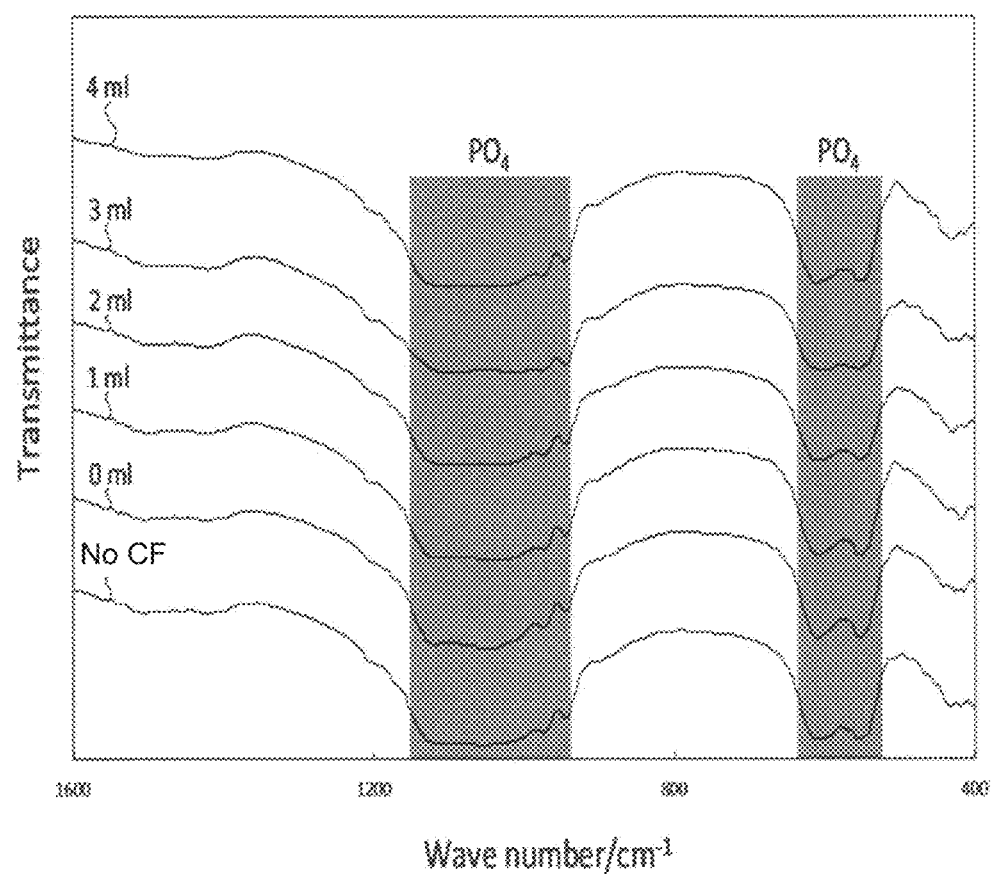
[FIG.4]

[FIG.5]
(1)
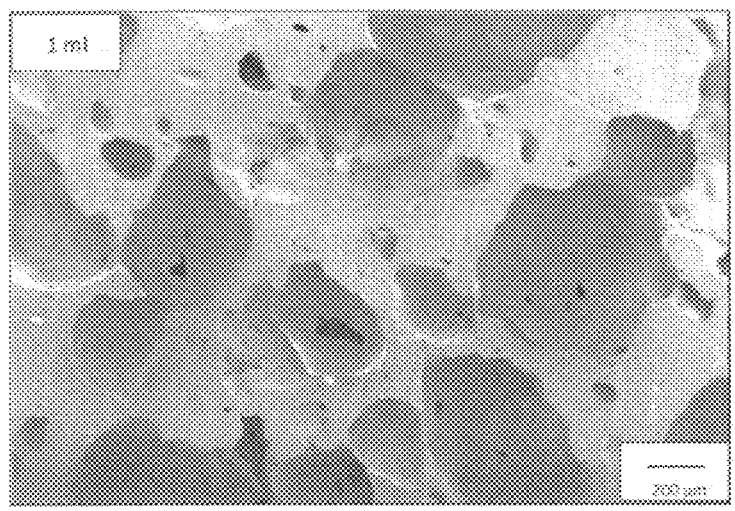
(2)
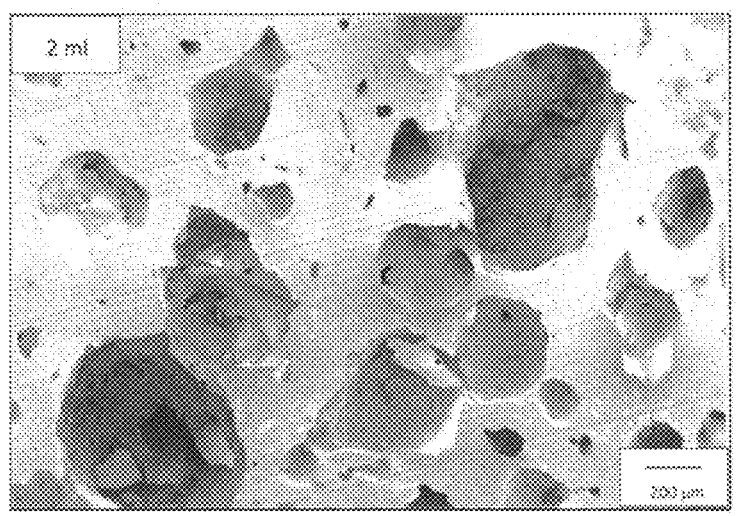
(3)
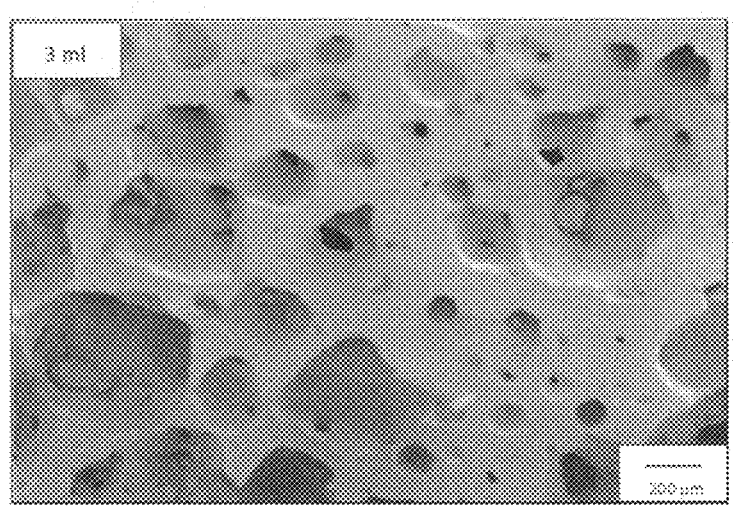

[FIG.6]
(1)
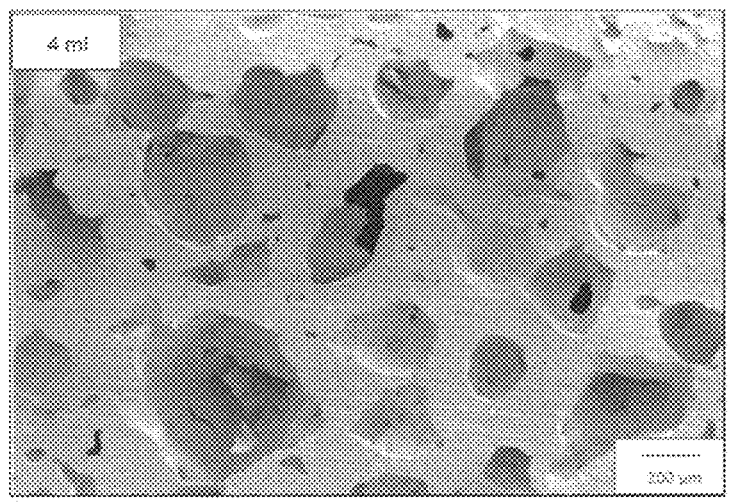
(2)
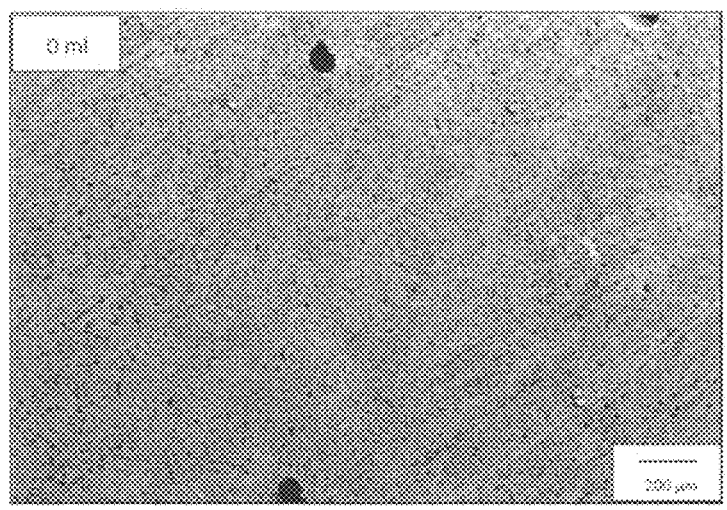
(3)
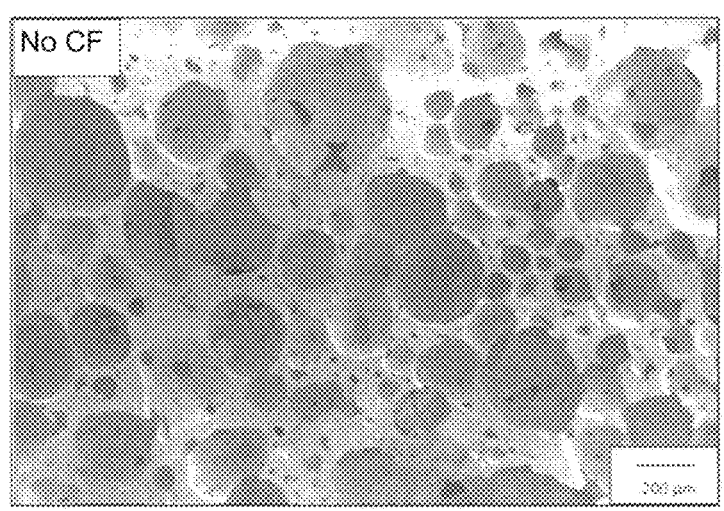

[FIG.7]
(1)
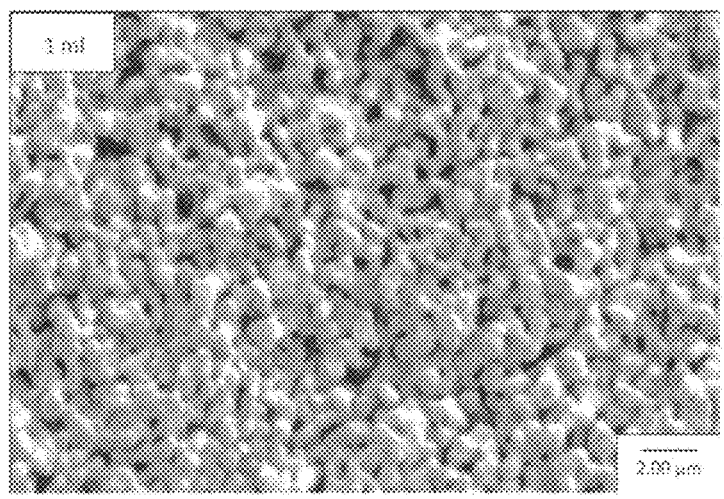
(2)
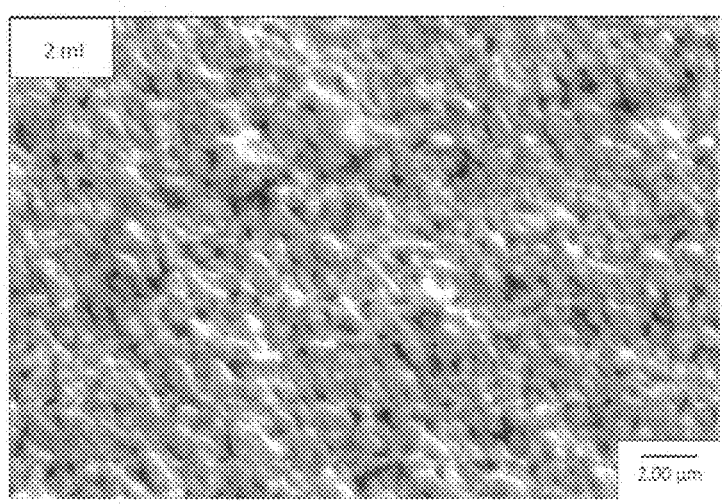
(3)
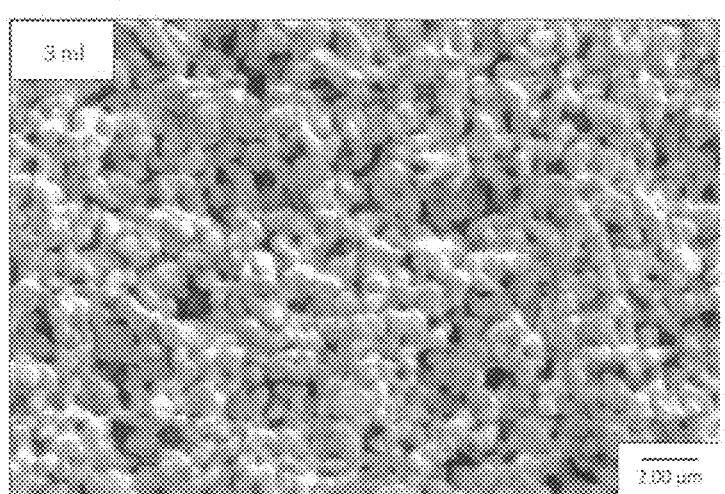

[FIG.8]
(1)
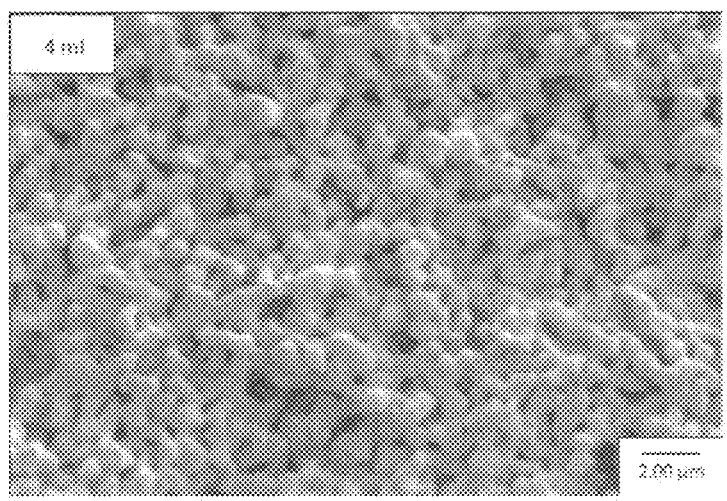
(2)
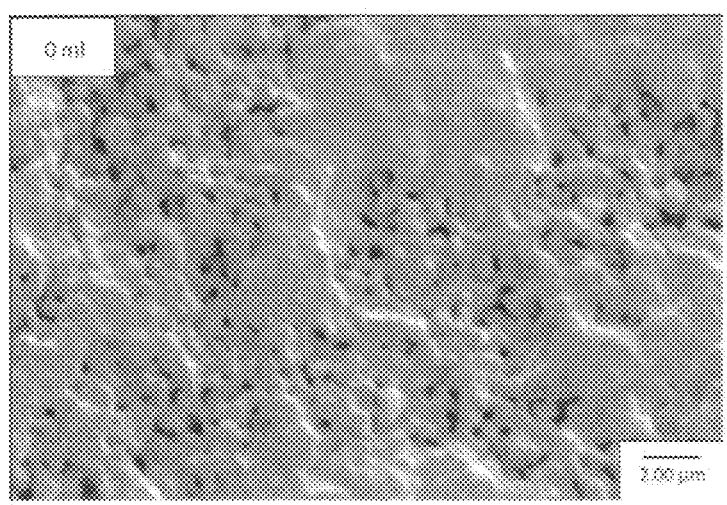
(3)
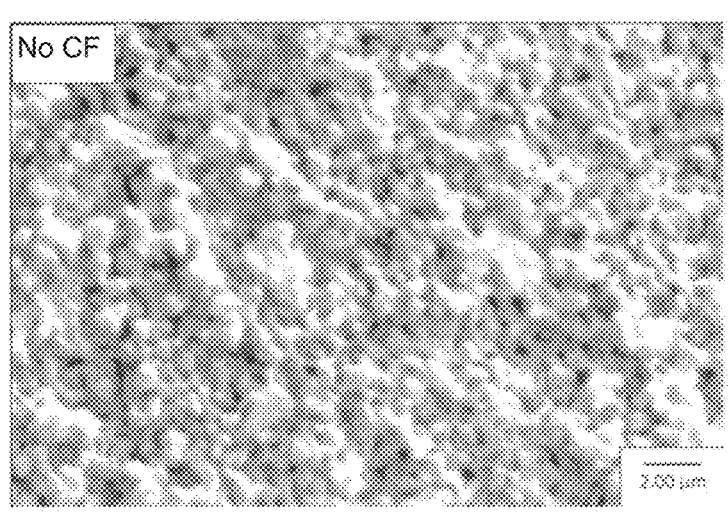

[FIG.9]
(1) (2)
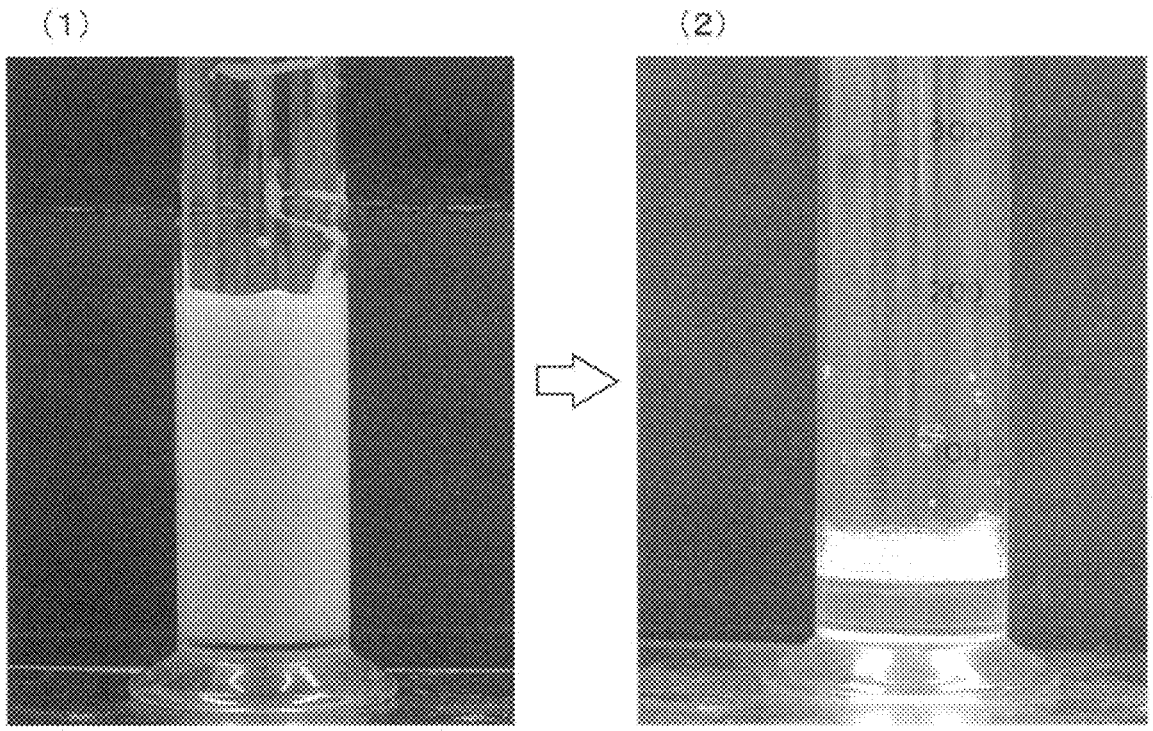
(3) (4)
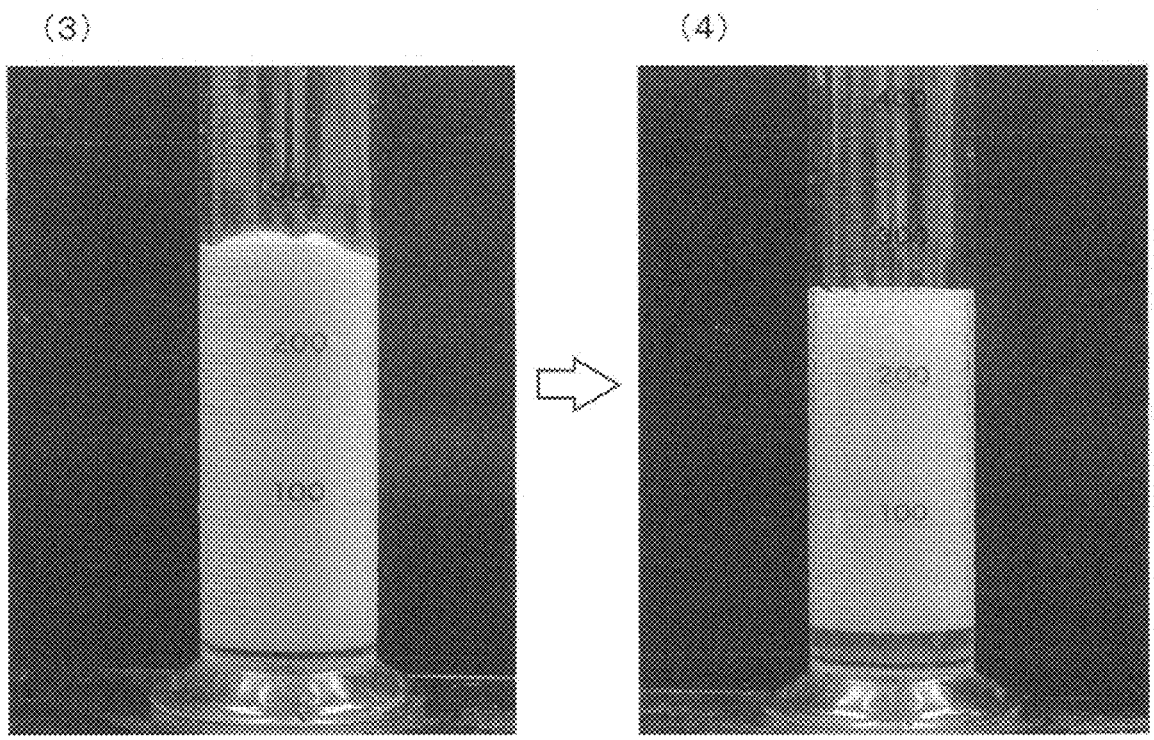

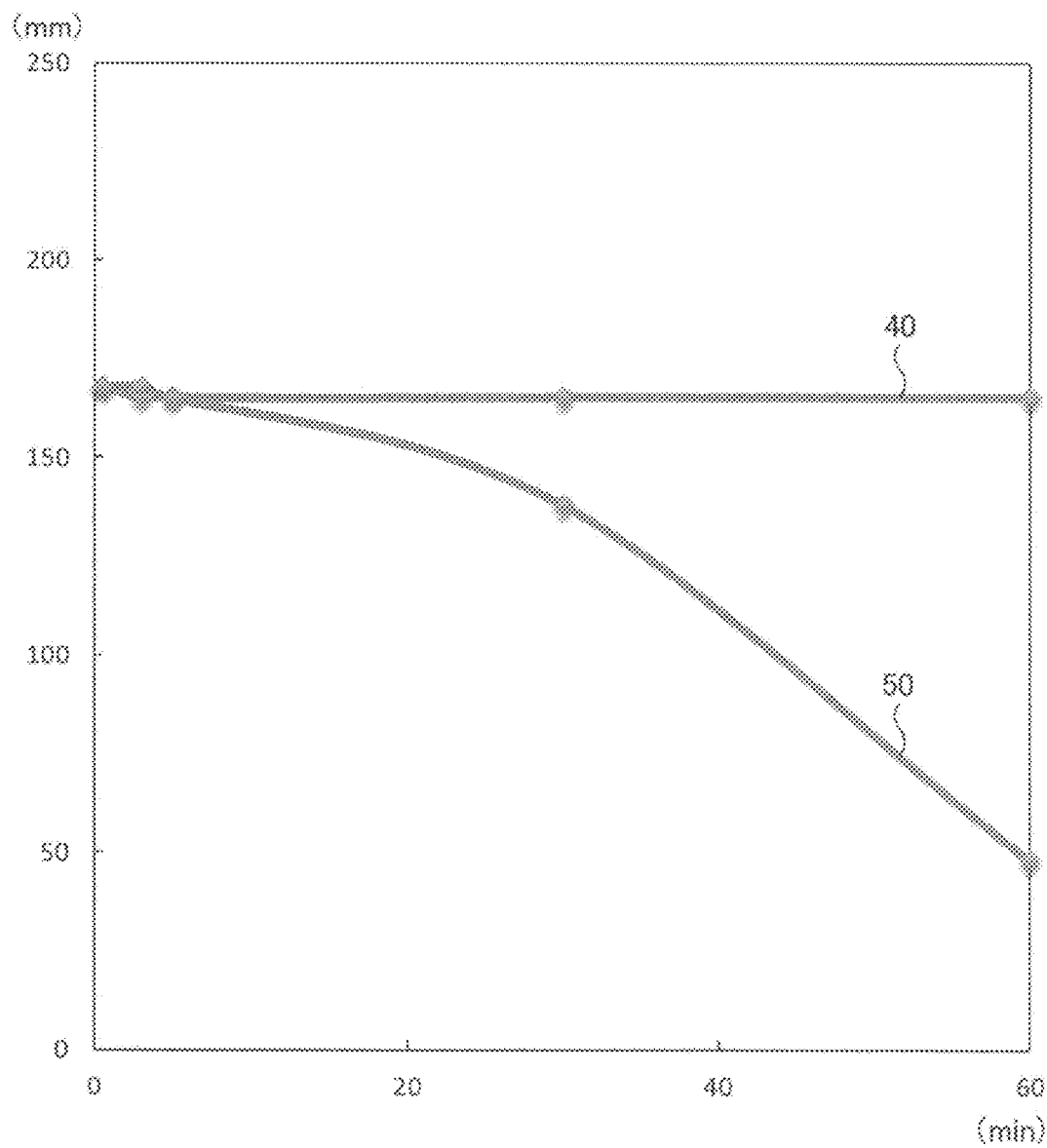
[FIG.10]

[FIG.11]
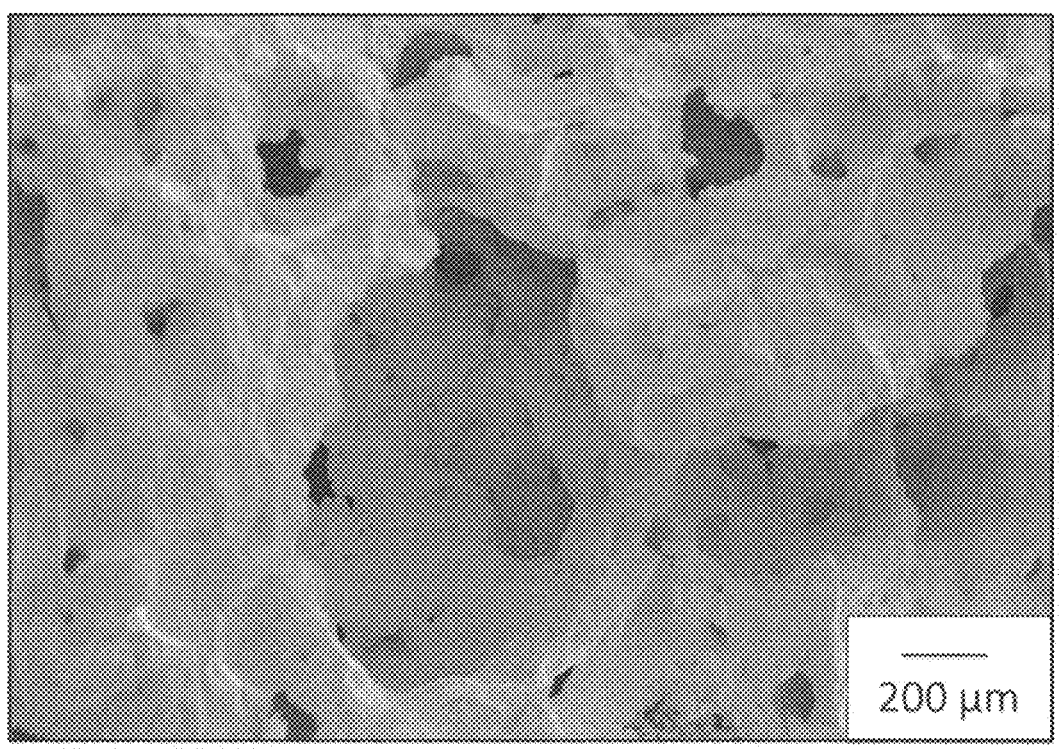

[FIG.12]
(1)
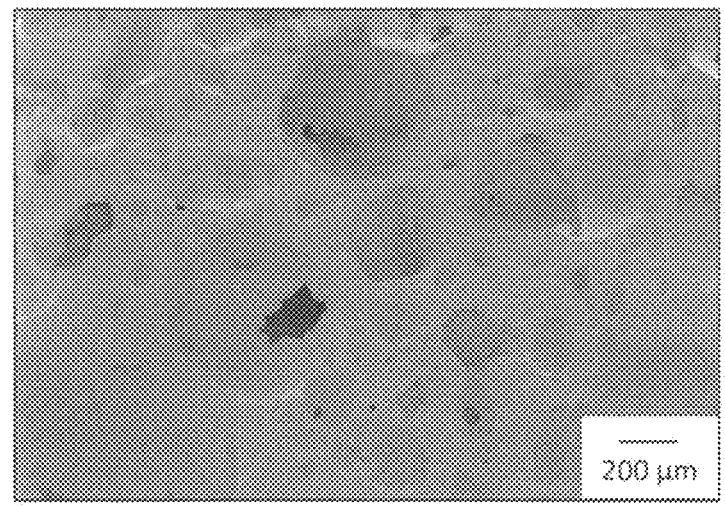
(2)
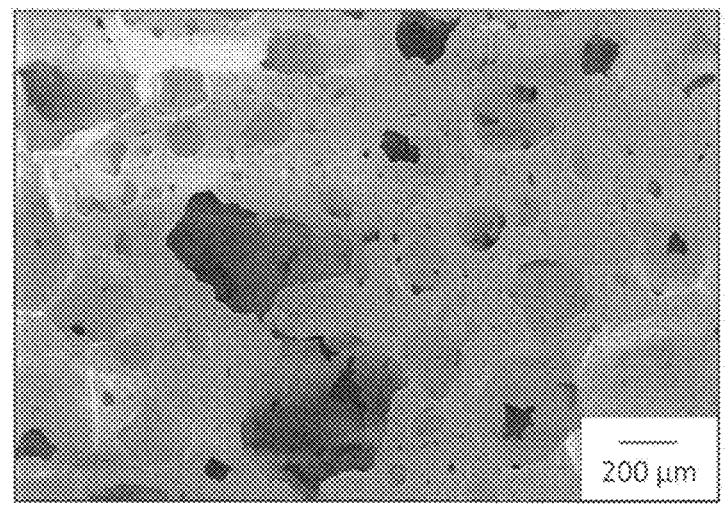
(3)
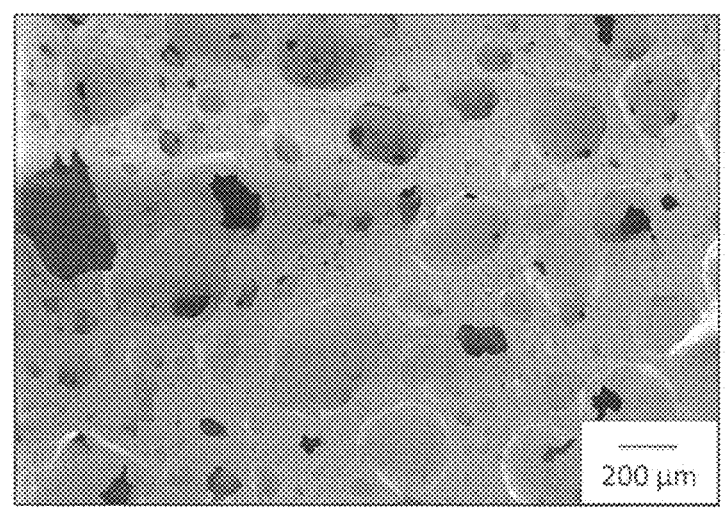

[FIG.13]
(1)
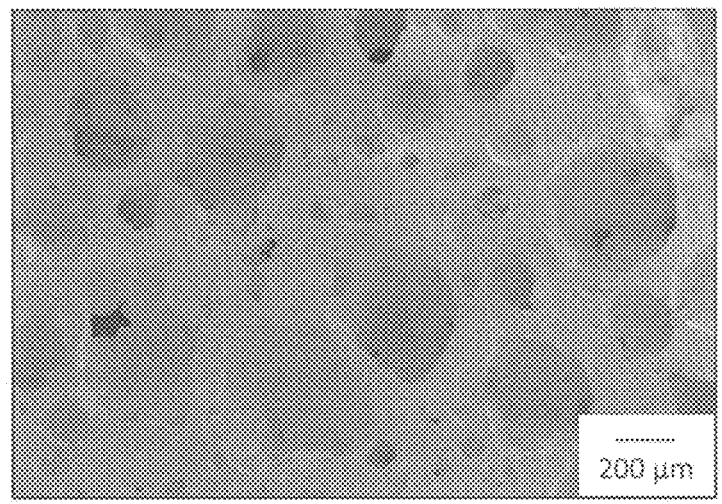
(2)
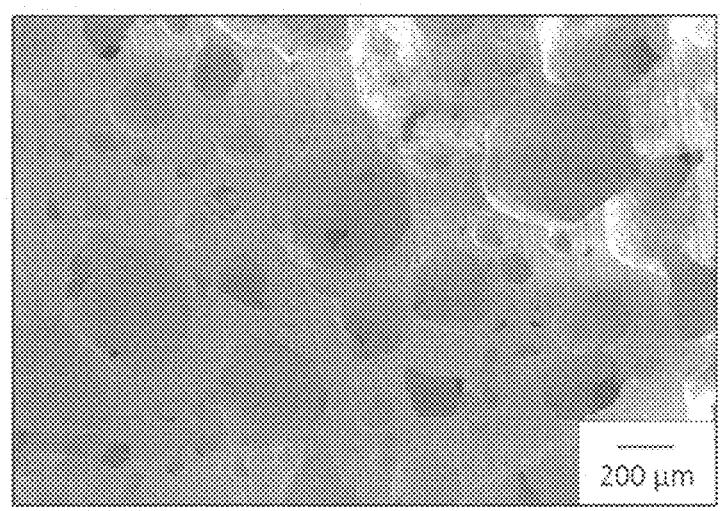
(3)
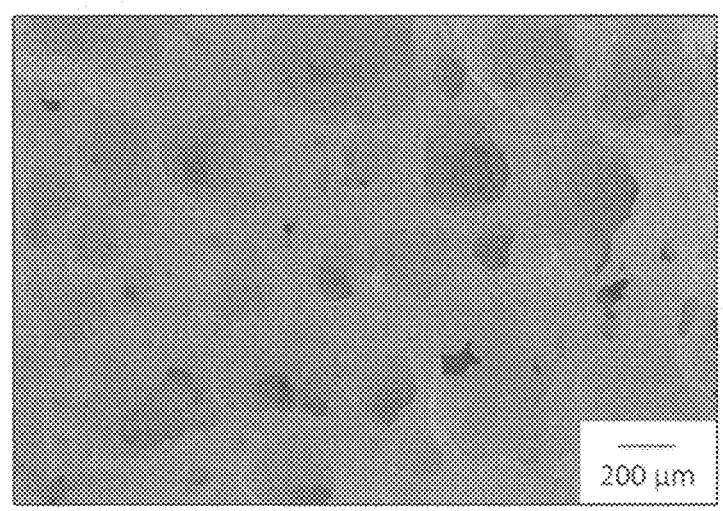

[FIG.14]
(1)
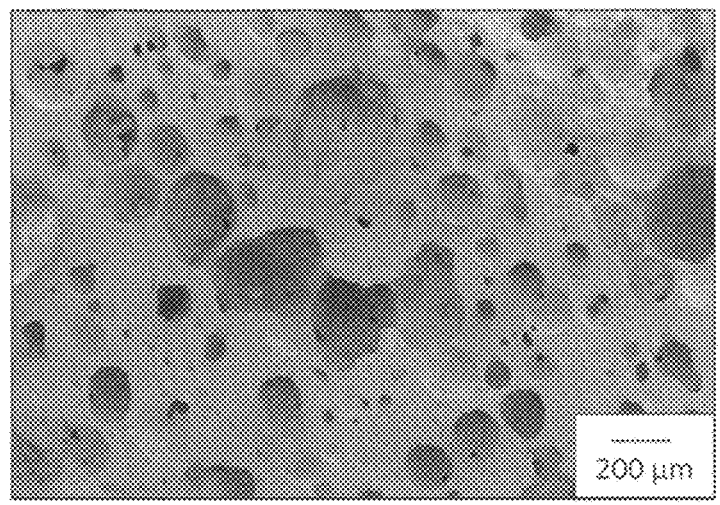
(2)
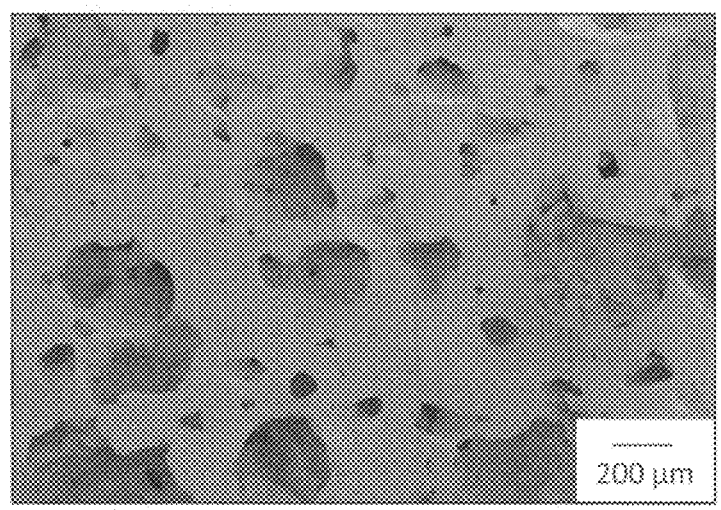
(3)
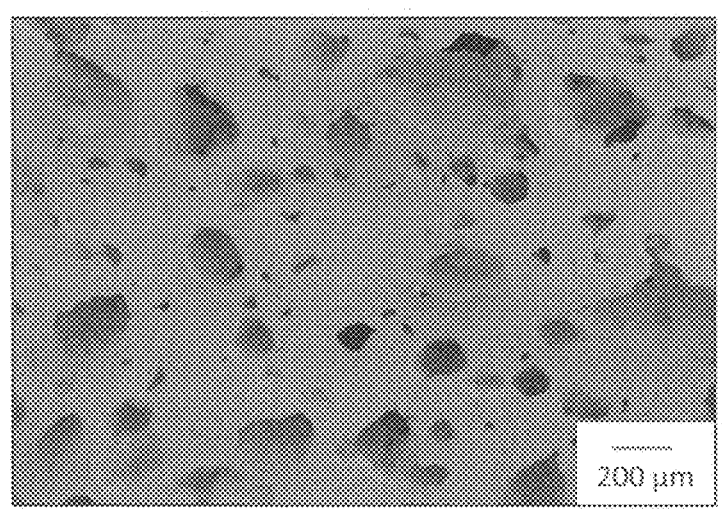

[FIG.15]
(1)
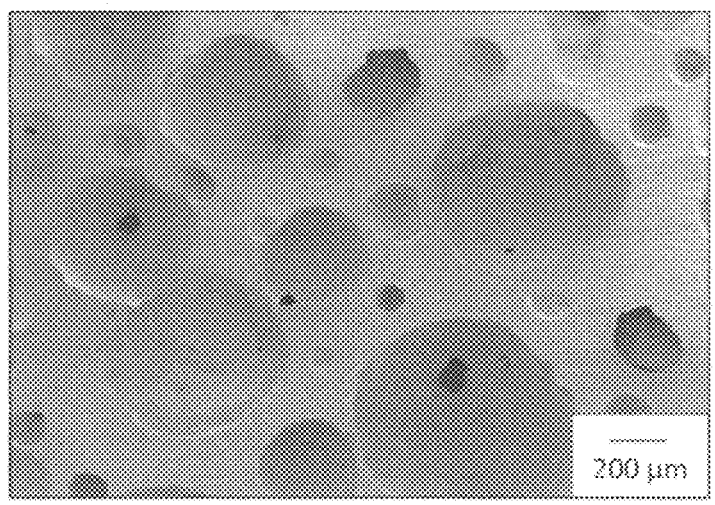
(2)
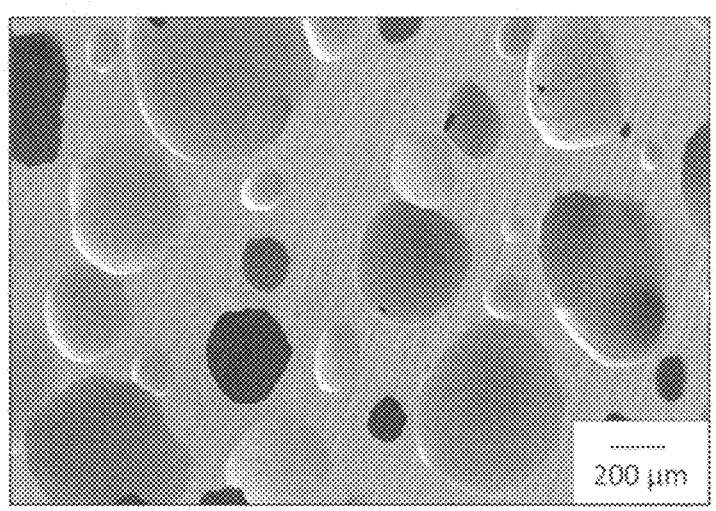
(3)
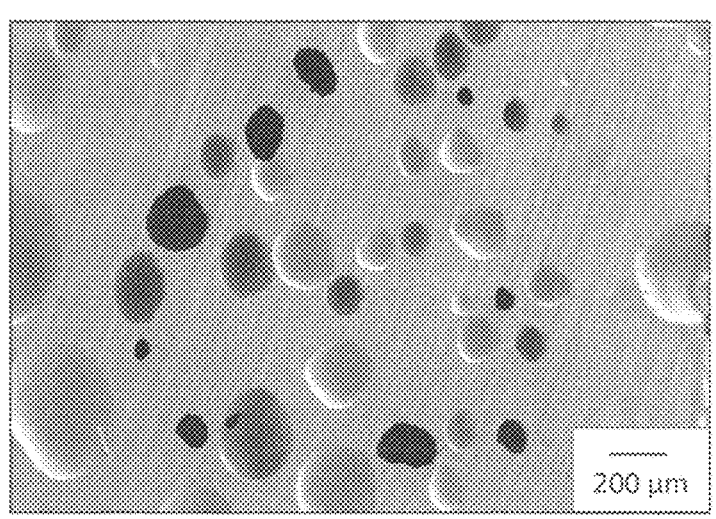

[FIG.16]
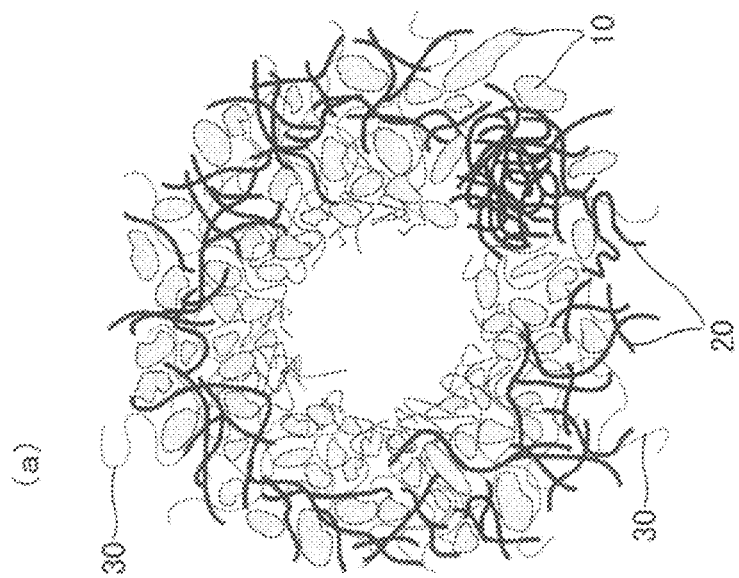

POROUS CERAMICS AND METHOD FOR PRODUCING POROUS CERAMICS

CROSS-REFERENCE TO RELATED APPLICATIONS

This application is the U.S. national stage application of International Application PCT/JP2020/021717, filed Jun. 2, 2020, which international application was published on Dec. 10, 2020, as International Publication WO 2020/246451 in the Japanese language. The International Application claims priority of Japanese Patent Application No. 2019-104303, filed Jun. 4, 2019. The international application and Japanese application are both incorporated herein by reference, in entirety.

TECHNICAL FIELD

The present invention relates to porous ceramics that may be used as bone substitute materials or the like.

BACKGROUND ART

As an example of a production process of porous ceramics that are used as bone substitute materials or the like, there is known a production process to use β-calcium phosphate as a raw material, which is foam molded and then dried and sintered. By this process, porous ceramics with a pore size of 50 to 1000 μm are produced (Patent Literature 1). According to this process, the pores are formed by sintering the pores resulting from foaming.

During the foam formation, foam of various diameters from small to large are formed, and in the process until completion of the drying, pores of smaller diameters are joined into pores of larger diameters, and foam of larger diameters float toward the upper part of the foamed product to break.

As such, pores of larger diameters are not uniformly distributed over the entire porous ceramics thus formed, but distributed more in the upper part of the porous ceramics. As a result, the porous ceramics thus formed have a biased pore distribution.

On the other hand, Patent Literature 2 proposes porous ceramics having the pores uniformly distributed overall.

Specifically, the literature proposes, as porous ceramics for bone substitute materials or the like, a calcium phosphate porous body having "continuous fine vacancies of 0.05 to 1.3 mm uniformly distributed overall". It is also proposed to produce this calcium phosphate porous body by "adding a deflocculant to hydroxyapatite fine powders or β-tricalcium phosphate fine powders, followed by further addition of a frothing agent".

Bone substitute materials, in particular porous bone substitute materials having micropores as well as large pores of relatively larger diameters, with the larger pores distributed substantially uniformly, have a certain demand. The large pores provide a good scaffold for cell stretch, while the micropores are involved in penetration, immobilization, or the like of medicine or tissue fluids, and absence of the micropores are recognized to cause delay in bone formation. Further, with a biased pore size distribution over a bone substitute material, in particular a biased distribution of the large pores, cells or blood vessels may not smoothly penetrate the bone substitute material, which may cause delay in repair of bone defect.

In light of the above, porous ceramics with a biased pore distribution or porous ceramics having "continuous fine vacancies of 0.05 to 1.3 mm uniformly distributed overall" do not meet the above-mentioned demand.

CITATION LIST

Patent Literature

Patent Literature 1: JP 2002-282285 A
Patent Literature 2: JP S63-40782 A

SUMMARY OF INVENTION

Technical Problem

It is a primary object of the present invention to provide porous ceramics that meet the demand for bone substitute materials and the like.

Solution to Problem

Aspects for solving the above-mentioned problem are as follows.
<First Aspect>
Porous ceramics which are ceramics having pores,
wherein the pores including open pores and closed pores,
the open pores including a plurality of large-diameter open pores having a pore size within a range of 20 to 600 μm and a plurality of micro-diameter open pores having a pore size within a range of 1.0 μm or smaller, and
the large-diameter open pores are distributed substantially uniformly all over the ceramics.
<Second Aspect>
The porous ceramics, further to the first aspect, which has a porosity of 40 to 90%.
<Third Aspect>
The porous ceramics, further to the first aspect, wherein the open pores account for 80% or more of the pores.
<Fourth Aspect>
The porous ceramics, further to the first aspect, wherein the pores further include a plurality of small-diameter open pores having a pore size within a range of larger than 1.0 μm and 10.0 μm or smaller.
<Fifth Aspect>
A method for producing porous ceramics, including:
mixing a ceramic raw material and a foaming aid to obtain a mixture,
adding a foaming agent to the mixture to form a foamed body, and
sintering the foamed body to obtain ceramics having a plurality of open pores.
<Sixth Aspect>
The method for producing porous ceramics, further to the fifth aspect,
wherein the mixture is obtained by mixing 100 parts by mass of the ceramic raw material and 1 to 200 parts by mass of the foaming aid.
<Seventh Aspect>
The method for producing porous ceramics, further to the fifth aspect,
wherein the foaming aid is at least one of cellulose fibers having an average fiber width of 0.5 to 50 μm and cellulose nanofibers.
(Primary Effect)
According to the present invention, a demand for porous ceramics that requires a plurality of types of vacancies (pores) with various pore sizes is met. More specifically, as bone substitute materials, for example, there are demands for porous ceramics having both large-diameter open pores and micro-diameter open pores, and porous ceramics having large-diameters open pores distributed substantially uniformly, and the present embodiment meets these demands. In contrast, according to the process for producing a calcium phosphate porous body disclosed in Patent Literature 1 discussed above, distribution of the large-diameter open pores over the resulting product may be biased. Patent Literature 2 employs a frothing agent, and thus a plurality of pore sizes cannot be imparted to the pores, and besides, no idea of imparting a plurality of sizes is taught.

As the porosity (pore volume/volume of porous ceramics×100(%)) is 40 to 90%, stretch of blood vessels or cells, and flux or adsorption of nutrients or proteins are assumed to be carried out non-stressfully.

Further, where the open pores account for 80% or more of the pores, the open porosity (open pore volume/volume of porous ceramics×100(%)) may be maintained at or even increased from the conventional open porosity, so that the strength of the porous ceramics may be ensured at a prescribed level to meet the demand.

Further, with the presence of vacancies (open pores) formed of communicated pores, the present porous ceramics may more readily comply with blood vessels, cells, nutrients, proteins, and the like.

In addition, the inventors deduce that, when the cellulose fibers are used as the foaming aid, the foaming aid exhibits suppressive effect on dissipation by breaking or the like of foam (suppressive effect on foam breaking). That is, the addition of the foaming aid makes the foam hard to dissipate, and maintains the shape of the foam thus formed for a prolonged period of time. It is assumed that the foaming aid acts to suppress fluidization of surfactant molecules forming the foam. In other words, a quantity of the foaming aid adheres to the foam films to suppress their breaking. Further, when the cellulose fibers are used as the foaming aid, in addition to the above-discussed effect, advantageous formation of small-diameter open pores and micro-diameter open pores may also result.

It is estimated that the large-diameter open pores are predominantly formed of the foam, whereas the micro-diameter open pores are predominantly formed by the loss of cellulose nanofibers. It is also estimated that the small-diameter open pores are predominantly formed by the loss of cellulose fibers or cellulose nanofibers. The small-diameter open pores and micro-diameter open pores have more uniform pore sizes, compared to those of the large-diameter open pores, which are formed from the foam derived from the foaming agent. With the presence of a plurality of types of open pores from the micro-diameter to the large diameter, the present porous ceramics are suitable for the application to the bone substitute materials.

Further, the micro-diameter open pores, which are assumed to have been formed by the loss of simple cellulose fibers through sintering or the mutual sticking of ceramic raw material, assist the porous ceramics to become autologous bones through penetration and immobilization of medicine or tissue fluids therein.

Effect of the Invention

According to the present invention, there is provided porous ceramics that also meet the need for bone substitute materials and the like.

BRIEF DESCRIPTION OF THE DRAWINGS

FIG. 1 is a SEM image of β-TCP.
FIG. 2 is a SEM image of cellulose nanofibers.
FIG. 3 shows the XRD patterns of the porous bodies.
FIG. 4 shows the FT-IR spectra of the porous bodies.
FIG. 5 shows SEM images of the porous bodies.
FIG. 6 shows SEM images of the porous bodies.
FIG. 7 shows SEM images of the porous bodies.
FIG. 8 shows SEM images of the porous bodies.
FIG. 9 illustrates the foaming force test.
FIG. 10 is a graph indicating the foaming force test.
FIG. 11 is a SEM image of the dried boy.
FIG. 12 shows SEM images of the porous bodies.
FIG. 13 shows SEM images of the porous bodies.
FIG. 14 shows SEM images of the porous bodies.
FIG. 15 shows SEM images of the porous bodies.
FIG. 16 shows conceptual diagrams of the pores.

DESCRIPTION OF EMBODIMENTS

Next, embodiments for carrying out the present invention will be discussed. The embodiments are mere examples of the present invention, and the scope of the present invention is not limited by the scope of the embodiments.
(Production Method)

For producing the porous ceramics according to the present embodiment, first a ceramic raw material and a foaming aid are mixed.

The ceramic raw material may be one or more members selected and used from the group consisting of, for example, alumina, zirconia, mullite, cordierite, titania, sialon, carbon, silicon carbide, silicon nitride, spinel, nickel aluminate, aluminum titanate, and calcium phosphate. When the porous ceramics of the present embodiment is to be used as a bone substitute material, calcium phosphate is preferably used.

The calcium phosphate may be one or more members selected and used from the group consisting of, for example, hydroxyapatite, tricalcium phosphate, dibasic calcium phosphate, tetracalcium phosphate, octacalcium phosphate, and calcium phosphate-based glass. Use of β-tricalcium phosphate ($\beta$-$Ca_3(PO_4)_2$) (referred to simply as β-TCP hereinbelow) is particularly preferred.

The ceramic raw material is preferably in the form of powders having an average particle size of 1 μm or smaller, more preferably in the form of powders having an average particle size of 0.3 to 0.5 μm.

Powders of β-TCP may preferably be produced in the following method.

First, to calcium carbonate ($CaCO_3$) and calcium hydrogen phosphate dihydrate ($CaHPO_4.2H_2O$), pure water is added and mixed, for example, in a mixer, such as a ball mill or a kneader. This mixing is preferably performed, for example, for 24 to 48 hours. The pure water is preferably heated to 70 to 90° C., where necessary.

Next, the mixture obtained from the mixing is dried. The drying is preferably performed, for example, at 60 to 70° C. It is also preferred to perform the drying for 24 to 48 hours.

The dried product obtained from the drying is ground for a time. The grinding is preferably performed until the average particle size falls within the range of, for example, 0.3 to 0.5 μm. This grinding may be carried out using a grinding instrument, such as an agate mortar, an automatic mortar, a stamp mill, a dry ball mill, or a hammer mill.

The ground product obtained from the grinding is then calcined. The calcination is preferably performed, for example, at 700 to 800° C. Here, the temperature may be raised at a rate of, for example, 3° C./min. This calcination is preferably performed for 8 to 24 hours.

The calcined product obtained from the calcination is ground again. This grinding is preferably performed until the average particle size falls within the range of, for example, 0.3 to 0.5 μm. This grinding is also preferably carried out using the grinding instrument discussed above.

In this way, powdered β-TCP is obtained.

On the other hand, the foaming aid to be mixed with the ceramic raw material may be, for example, a plurality of types of cellulose fibers having various fiber widths, cellulose fibers, or aggregates of cellulose fibers. It is noted that cellulose fibers are thermally degradable, and vaporized or otherwise to disappear upon heating.

Here, the meaning of the term "a plurality of types of cellulose fibers having various fiber widths" is explained. A plurality of types of cellulose fibers having various fiber widths according to the present embodiment means that cellulose fibers are of a plurality of types, assuming that cellulose fibers having an average fiber width within a certain range are counted as one type, and cellulose fibers having an average fiber width within another certain range are counted as another type.

An example of a plurality of types of cellulose fibers having various fiber widths may be a mixture of cellulose fibers like pulp having an average fiber width of 10 to 50 μm, cellulose fibers treated in a refiner or the like to have an average fiber width of 0.5 to 50 μm, preferably 0.5 to 2.0 μm, and cellulose nanofibers (CNF) further treated in a high-pressure homogenizer or the like to have an average fiber width of 0.1 μm or shorter.

A raw material of the cellulose fibers, including cellulose nanofibers, may be one or more members selected and used from the group consisting of, for example, wood pulp made from hardwood, softwood, or the like; non-wood pulp made from straw, bagasse, or the like; and de-inked pulp (DIP) made from recovered used paper, waste paper, or the like.

Here, use of wood pulp is preferred for avoiding contamination of impurities as much as possible. As the wood pulp, one or more members may be selected and used from the group consisting of, for example, chemical pulp, such as hardwood kraft pulp (LKP) and softwood kraft pulp (NKP), and mechanical pulp (TMP). The hardwood kraft pulp may be hardwood bleached kraft pulp, hardwood unbleached kraft pulp, or hardwood semi-bleached kraft pulp. Similarly, the softwood kraft pulp may be softwood bleached kraft pulp, softwood unbleached kraft pulp, or softwood semi-bleached kraft pulp. As the mechanical pulp, one or more members may be selected and used from the group consisting of, for example, stone ground pulp (SGP), pressurized stone ground pulp (PGW), refiner ground pulp (RGP), chemi-ground pulp (CGP), thermo-ground pulp (TGP), ground pulp (GP), thermomechanical pulp (TMP), chemi-thermomechanical pulp (CTMP), refiner mechanical pulp (RMP), and bleached thermomechanical pulp (BTMP).

Cellulose nanofibers may be obtained by making the above raw material finer (defibrating). The defibration may be preceded by pretreatment by a chemical method. Such pretreatment by a chemical method may be, for example, hydrolysis of polysaccharides with acid (acid treatment), hydrolysis of polysaccharides with enzyme (enzyme treatment), swelling of polysaccharides with alkali (alkali treatment), oxidation of polysaccharides with an oxidizing agent (oxidation treatment), or reduction of polysaccharides with a reducing agent (reduction treatment).

An alkali treatment prior to the defibration causes partial dissociation of hydroxyl groups in hemicellulose or cellulose in pulp, resulting in anionization of the molecules, which weakens intra- and intermolecular hydrogen bonds to promote dispersion of the cellulose fibers during the defibration.

As the alkali used in the alkali treatment, for example, sodium hydroxide, lithium hydroxide, potassium hydroxide, an aqueous ammonia solution, or organic alkali, such as tetramethylammonium hydroxide, tetraethylammonium hydroxide, tetrabutylammonium hydroxide, and benzyltrimethylammonium hydroxide may be used. In view of the manufacturing cost, sodium hydroxide is preferably used.

The enzyme treatment, acid treatment, or oxidation treatment prior to the defibration may result in a low water retention degree, a high degree of crystallinity, and also high homogeneity of the cellulose nanofibers. In this regard, cellulose nanofibers at a low water retention degree are easily dried, so that, during drying of the mixture of the ceramic raw material and the cellulose nanofibers, the ceramic raw material may be kept more easily from being cracked. In this regard, the water retention degree of the cellulose nanofibers is preferably 500% or lower, more preferably 300 to 480%. The water retention degree may arbitrarily be adjusted by, for example, selection, pretreatment, or defibration of the raw material.

On the other hand, the enzyme treatment, acid treatment, or oxidation treatment causes decomposition of the amorphous region of hemicellulose and cellulose in pulp, which leads to reduction of energy required for making the fibers finer and to improvement in uniformity and dispersibility of the fibers. The uniformity of fibers directly affects the uniformity of pores. Further, with the above-mentioned pretreatment, the rate of the crystalline regions in the entire fibers is increased, which improves the dispersibility of cellulose nanofibers. The pretreatment, however, lowers the aspect ratio of cellulose nanofibers, so that excessive pretreatment is preferably avoided.

The defibration of the raw material may be performed by beating the raw material in, for example, beaters, high-pressure homogenizers, homogenizers, millstone friction machines, such as grinders and mills, single-screw kneaders, multi-screw kneaders, kneaders, refiners, and jet mills. It is preferred to use refiners or jet mills.

The degree of crystallinity of the cellulose nanofibers is preferably 50% or higher, more preferably 55% or higher. On the other hand, the degree of crystallinity of the cellulose nanofibers is preferably 90% or lower, more preferably 86% or lower. Cellulose nanofibers with a degree of crystallinity within the above-mentioned range are suitable for use as the foaming aid. The degree of crystallinity may arbitrarily be adjusted by, for example, selection, pretreatment, or defibration of the raw material.

The pulp viscosity of the cellulose nanofibers is preferably 1.5 cps or higher, more preferably 2.0 cps or higher. Cellulose nanofibers with a pulp viscosity within the above-mentioned range are suitable for use as the foaming aid.

A slurry obtained by dispersion of the cellulose nanofibers in water (1% concentration) has a B-type viscosity of preferably 1 to 100000 cps, more preferably 5 to 80000 cps, particularly preferably 100 to 10000 cps. A slurry of the cellulose nanofibers having a B-type viscosity within the above-mentioned range facilitates mixing with the ceramic raw material, drying and molding of the mixture, or the like.

In order to form pores having large diameters (large pores), use of a foaming agent, for example, may be conceivable, and control of the amount of additives, such as a dispersant, may also be conceivable to increase the diameter of open pores. Further, in order to form pores having still larger diameters, use of cellulose fiber aggregates may also be conceivable. However, it is preferred to use a foaming agent rather than the cellulose fiber aggregates. Use of a foaming agent more readily results in open pores and facilitates equalization of the size of the diameters. The pore size of the large-diameter open pores may be 20 to 600 µm, preferably 50 to 400 µm. Below 20 µm, the large-diameter open pores may hardly provide a good scaffold for cell stretch. Over 600 µm, the large-diameter open pores may result in dead space during cell stretch.

As used herein, "large pores" refers to an idea encompassing large-diameter open pores and large-diameter closed pores, "small pores" refers to an idea encompassing small-diameter open pores and small-diameter closed pores, and "micropores" refers to an idea encompassing micro-diameter open pores and micro-diameter closed pores.

Use of a foaming agent (foaming method) has the advantage that a number of empirical rules have been accumulated. As the foaming agent (blowing agent) to be used, one or more nonionic surfactants may be selected and used from the group consisting specifically of, for example, polyoxyethylene alkyl ethers, polyoxyethylene alkyl aryl ethers, polyoxyethylene alkylamines, polyethylene glycol fatty acid esters, alkanolamides, and polyethylene glycol-polypropylene glycol copolymers. Further, ethylene oxide may be added to these nonionic surfactants to prepare the foaming agent.

In regard to the nonionic surfactants as the foaming agent discussed above, an HLB value is generally used as an index of their hydrophobicity and hydrophilicity, and those having an HLB value of 10 or more are preferred. With an HLB value of less than 8, the hydrophobicity of the nonionic surfactant is stronger, so that it is hard to foam in a water slurry system, failing to provide porous ceramics with a desired porosity.

The porosity may be 40 to 90%, preferably 55 to 80%, more preferably 65 to 80%. With a porosity over this range, the porous ceramics have a low compressive strength, which causes problems in using the porous ceramics as a bone substitute material. With a porosity below this range, the porous ceramics may not provide good cell stretch when used as a bone substitute material.

Specifically, polyoxyethylene alkyl ether has a very weak toxicity and is weakly foaming to form a plurality of bubbles with moderate size, and may thus be used preferably without causing too large diameters of the large pores in the porous ceramics.

Generally, after the ceramic raw material and the foaming aid are mixed and a dispersant or the like is added to the resulting mixture, mixing is carried out, for example, using a mixer, such as a hand blender or a multi-stick blender. The mixing is preferably carried out, for example, for 5 to 10 minutes. Further, simultaneously with this mixing, the mixture may be subjected to ultrasonic irradiation, which preferably results in a more homogeneous mixture.

It is preferred to add the dispersant discussed above to the mixture of the ceramic raw material, such as β-TCP, and the foaming aid, or during mixing of the ceramic raw material and the foaming aid.

As the dispersant, one or more water-soluble polymer compounds may be selected and used from the group consisting of, for example, polyacrylic acid, derivatives of polyacrylic acid, such as ammonium salt of polyacrylic acid, and ammonium polycarboxylate.

It is preferred, as the dispersant, to use a dispersant having both the function to disperse the cellulose fibers and the function to disperse the ceramic raw material. Such a dispersant may preferably be ammonium polyacrylate (PAA). PAA is used as a deflocculant for a ceramic raw material when a foaming agent is used for pore formation, and it is found that PAA is also useful when cellulose fibers are used as a foaming aid.

It is preferred that the PAA is used at a high concentration, preferably 10 vol % or higher, more preferably 25 to 45 vol %, particularly preferably 30 to 40 vol %. Dispersibility may alternatively be adjusted by the amount to be added, rather than the concentration.

A 30 to 40 vol % dispersant may be added by 50 to 300 ml with respect to 100 parts by weight (g) of the ceramic raw material. By below 50 ml, the desired dispersibility may not be attained. By over 300 ml, burden in the subsequent drying is increased, and a longer drying time or a higher drying temperature may be required, which, however, causes ready shrinkage and thus cracking of the ceramic raw material.

With PAA at too high a concentration, the resulting porous ceramics tend to be crumbling.

In this way, the ceramic raw material, the foaming aid, and the dispersant are mixed and, to the resulting mixture the foaming agent is added and mixed, for example, in a mixer, such as a hand blender or a multi-stick blender. The mixing is preferably carried out, for example, for 5 to 10 minutes. Further, simultaneously with this mixing, the mixture may be subjected to ultrasonic irradiation, which preferably results in a more homogeneous mixture. This mixing results in a foamed body. A conceptual diagram of the foam thus formed is shown in FIG. 16(a). The foam encapsules a gas, forming generally a spherical shape. The curvilinear surface constituting the foam is formed of the hydrophobic parts of the foaming agent 30, and the foaming aid 20 and the ceramic raw material 10 are attached to the hydrophilic parts of the foaming agent 30.

Next, the foamed body thus obtained by the mixing is subjected to tapping for removing extraordinarily foamed large pores, and then dried at a low temperature. The drying temperature may be, for example, 35 to 70° C., preferably 40 to 60° C. The duration of drying may be, for example, 2 to 5 days, preferably 3 days. In this regard, according to the present embodiment, the cellulose nanofibers are used to form the micro-diameter open pores, for which gentle drying is suitable. If this drying is performed drastically, cracking of the ceramic raw material may result.

Here, if the ceramic raw material, the foaming agent (nonionic surfactant), and the dispersant are mixed without the foaming aid, and the resulting foamed body is dried, the distribution of the pores is biased. That is, large pores are found more in the upper part of the mixture and less in the lower part of the mixture. This may be explained as follows. When the gas-liquid interface of the foam in the mixture is constituted by the nonionic surfactant, the external surface of the foam is rendered hydrophilic. While the mixture is being dried, the hydrophilic foam floats upwards in the mixture (water slurry system) or breaks.

On the other hand, in a mixture obtained by further admixing the foaming aid, the foaming aid controls the floating of the foam, controls the breaking of the foam (maintains the shape of the foam), or promotes formation of larger foam. This is assumed to be affected by the interaction between the hydrophilicity of the foaming aid and the hydrophilicity of the foaming agent (nonionic surfactant).

Further, by changing the amount of the foaming aid to be added, the pore size of large pores may be controlled. By increasing the amount of the foaming aid, which is hydrophilic, the surface area of the hydrophilic pore surfaces is increased to thereby reduce the size of the pores to be formed.

The amount of the foaming aid to be added and mixed may be 1 to 200 parts by mass, preferably 10 to 150 parts by mass, more preferably 20 to 100 parts by mass, based on 100 parts by mass of the ceramic raw material. At less than 1 part by mass, the effect of controlling the foam breaking is poor. At over 200 parts by mass, the dispersibility of the foaming aid in the mixture is poor.

The dried product obtained from the drying is sintered. The sintering is performed preferably in two or more, i.e., a plurality of steps (stages), more preferably in four steps. The sintering in four steps may be carried out at a first temperature of 150 to 200° C. (preferably 160 to 180° C.) for 2 to 6 hours, at a subsequent second temperature of 250 to 350° C. (preferably 280 to 320° C.) for 2 to 6 hours, at a subsequent third temperature of 350 to 450° C. (preferably 380 to 420° C.) for 2 to 6 hours, and at a subsequent fourth temperature of 950 to 1100° C. (preferably 1000 to 1050° C.) for 0.5 to 24 hours. According to this embodiment, the sintering at the first to the third temperatures mainly vaporizes and removes the foaming aid, such as the cellulose fibers, whereas the sintering at the fourth temperature sinters the ceramic raw material. The stepwise temperature increases result in removal of the foaming aid and the like, followed by densification of the ceramic raw material, so that pores of large diameters and pores of small diameters may be formed reliably.

If the foaming aid is removed at once at a high temperature, rather than by sintering under the stepwise temperature increase, cracks or the like will be formed in the ceramic raw material. Incidentally, the rate of the temperature increase may be, for example, 1 to 5° C. per minute.

(Porous Ceramics)

The porous ceramics according to the present embodiment thus produced have a plurality of pores. A conceptual diagram of the pores in the porous ceramics thus produced is shown in FIG. 16(b). The pores are formed of ceramics 10 on their outer peripheries. The sintering causes the loss of the foaming aid and the foaming agent. The porous ceramics thus produced has a structure in which large pores (at least one of large-diameter open pores and large-diameter closed pores) are distributed substantially uniformly all over. These pores include open pores and closed pores. Incidentally, Patent Literature 2 discussed above describes that the pores in the sintered product are all open pores with no closed pores. However, it is known to the present inventors and others that according to the conventional method using a foaming agent as a foaming aid (foaming method), the closed porosity is as high as about 30%.

On the other hand, in the porous ceramics according to the present embodiment, the open pores account for 80% or more (preferably 90% or more) of the pores, whereas the closed pores are held down to 20% or less (preferably 10% or less, more preferably 5% or less) of the pores. In this way, with such a high percentage of the open pores, the open porosity (open pore volume/volume of porous ceramics×100(%)) may be maintained at or even increased from the conventional level, without drastically increasing the porosity (total pore volume/volume of porous ceramics×100(%)). Accordingly, the strength of the porous ceramics will not be deteriorated. In this regard, for example, a bone substitute material, which is filled in bone defects, reinforces the bone defects during the initial phase until the bone defects are repaired, and is absorbed into living bone after the bone defects are repaired. Thus, the strength of the bone substitute material is of crucial importance. Further, such a possibility of a high open porosity realizes coexistence of open micropores and open macropores, as will be discussed below.

In the porous ceramics according to the present embodiment, the open pores include both the large-diameter open pores having pore sizes within the predetermined range and the micro-diameter open pores having pore sizes smaller than those of the large-diameter open pores. With both the large-diameter open pores and the micro-diameter open pores, the porous ceramics according to the present embodiment are rendered, when used as a bone substitute material for example, compatible with both blood vessels, cells, or the like and nutrients, proteins, or the like. Note that the pore size of the micro-diameter open pores is 1 μm or smaller, preferably 0.5 μm or smaller.

The open porosity of the porous ceramics according to the present embodiment is preferably 55% or more, more preferably 65% or more. The ceramic raw material of the present embodiment has the limited percentage of the closed pores as discussed above, so that even with such a high open porosity, problems in strength rarely arise.

The porous ceramics according to the present embodiment have, more preferably, as the open pores, both the large-diameter open pores and small-diameter open pores having pore sizes ranging between the large-diameter open pores and the micro-diameter open pores. According to this embodiment, three types of open pores, namely, the micro-diameter open pores, the small-diameter open pores, and the large-diameter open pores, are present, and the porous ceramics of the present embodiment, when used as a bone substitute material, for example, more fully match the demand. The pore size of the small-diameter open pores is preferably larger than 1.0 μm and 10.0 μm or smaller, more preferably larger than 1.0 μm and 2.0 μm or smaller.

The porous ceramics according to the present embodiment may be provided in the form of a hexahedron, such as a cube (e.g., 1 cm on a side) or a cuboid (3 to 4 cm×3 to 4 cm×2 cm), a sphere, or the like. For obtaining the porous ceramics of this size, for example, a large bulk of porous ceramics is manufactured and cut into pieces of a desired size. By being manufactured in a large bulk and cut into small pieces, the porous ceramics are rendered more homogenous.

(Use)

The porous ceramics according to the present embodiment may preferably be used as a bone substitute material. Aside from biomaterials like bone substitute materials, the porous ceramics may also be used as, for example, filters, electrodes for fuel cells or gas/humidity sensors, catalyst carriers, heat insulating materials, or additives for medicine for oral administration, processed foods, beverages, various adsorbent columns, cosmetics, dentifrices, air refreshers, deodorants, bath salts, face washes, shampoos, toiletry products, or the like.

(Others)

As used herein, the open pores refer to the pores communicated with the surface of porous ceramics. On the other hand, the close pores refer to the pores present inside and not communicated with the surface of porous ceramics. Accordingly, when the porous ceramics according to the present embodiment are used as a bone substitute material, the open pores play an important role.

As used herein, the open porosity is measured by Archimedes' method. The closed porosity (closed pore volume/volume of porous ceramics×100(%)) is a value obtained by subtracting the open porosity from the porosity, wherein the porosity is a value calculated from the bulk specific gravity determined by the Archimedes' method and the calculated density (theoretical density).

As used herein, the bone substitute material refers to the porous ceramics used as a bioimplant material for filling bones, teeth, tooth roots, or the like.

As used herein, the average fiber width (diameter) of cellulose fibers, including cellulose nanofibers, is determined as follows.

First, 100 ml of an aqueous dispersion of cellulose fibers having a solid concentration of 0.01 to 0.1 mass % is filtered through a Teflon (registered trademark) membrane filter, and subjected to solvent substitution once with 100 ml of ethanol and three times with 20 ml of t-butanol. Then the resulting mass is lyophilized and coated with osmium to obtain a sample. An electron microscopic SEM image of this sample is observed at a magnification of 5000, 10000, or 30000 folds, depending on the width of the constituent fibers. Specifically, two diagonal lines are drawn on the observation image, and three arbitrary straight lines passing the intersection of the diagonals are drawn. Then, the widths of a total of 100 fibers crossing these three straight lines are visually measured. The median diameter of the measured values is taken as the average fiber diameter.

As used herein, the degree of crystallinity is a value determined by X-ray diffraction in accordance with JIS K0131 (1996) "General Rule of X-Ray Diffraction Analysis". Note that cellulose fibers have amorphous portions and crystalline portions, and the degree of crystallinity is the percentage of the crystalline portions in the overall cellulose fibers.

As used herein, the pulp viscosity is measured in accordance with JIS-P8215 (1998). A higher pulp viscosity indicates a higher degree polymerization of the cellulose fibers.

As used herein, the B-type viscosity of cellulose nanofiber slurry (1%) is measured in accordance with JIS-Z8803 (2011).

As used herein, the water retention degree is measured by a method for measuring water retention degree in accordance with JAPAN TAPPI No. 26: 2000.

As used herein, the pore size of pores is an average of visually measured pore sizes, measured as the diameters of circles, of arbitrarily selected 100 pores in a SEM image.

EXAMPLES

Next, examples of the present invention will be discussed.

Experiment 1

Porous ceramics (porous bodies) were produced from β-TCP powders and cellulose nanofibers (CNF), and the average pore size, open porosity, closed porosity, and bulk density of the resulting porous body were measured for each porous body. In this experiment, the amount of the foaming agent (polyoxyethylene alkyl ether (NIKKOL BT-7 manufactured by NIKKO CHEMICALS CO., LTD.)) was varied. As a comparative experiment, porous ceramics (porous body) were produced from the β-TCP powders (without cellulose nanofibers mixed). The details are as follows.

(Synthesis of β-TCP Powders)

The β-TCP powders were synthesized in the following procedure.

First, to calcium carbonate (0.075 mol) and calcium hydrogen phosphate dihydrate (0.15 mol) (Ca/P=1.50), 450 ml of pure water at 80° C. were added, and mixed for 24 hours using a ball mill and zirconia balls. Then, the resulting mixture was dried at 70° C. for 24 hours. The obtained dried product was ground in an agate mortar, and calcined at 750° C. for 10 hours. The rate of temperature increase was 3° C./min. The obtained calcined product was ground into powders (β-TCP powders). A SEM image of the powders is shown in FIG. 1.

(Production of Porous Body)

Thirty grams of the β-TCP powders thus obtained and 30 g of cellulose nanofibers were mixed, to which 30 ml of a 30% aqueous solution of ammonium polyacrylate (PAA) were added, and mixed under ultrasonic irradiation for five minutes using a hand blender (multi hand blender) to obtain a first mixture. Then, the polyoxyethylene alkyl ether (BT-7) was added to the first mixture, and mixed again under ultrasonic irradiation for five minutes using the multi hand blender to obtain a second mixture (foamed body). Here, various amounts of BT-7, 1.0 ml (0.95 g), 2.0 ml (1.90 g), 3.0 ml (2.85 g), or 4.0 ml (3.80 g), were used. Then, each second mixture (foamed body) was placed in a rectangular crucible and tapped (sample shape: 60 mm×60 mm×tapping height 25 mm). By this tapping, the foam was adequately broken. Then, the tapped mixture was dried at 40° C. for 72 hours. The resulting dried product was subjected to four-step sintering. This sintering was carried out at 180° C. (first temperature) for 4 hours, at 300° C. (second temperature) for 4 hours, at 400° C. (third temperature) for 4 hours, then at 1000° C. for 40 minutes, and then the temperature was lowered by 5° C. per minute down to ordinary temperature. The rate of temperature increase up to each subsequent step was 5° C. per minute. Incidentally, a SEM image of the second mixture (foamed body) after the drying (intermediate product of Test Example 4 in Table 1) is shown in FIG. 11.

A SEM image of the cellulose nanofibers used is shown in FIG. 2. The cellulose nanofibers (CF-(4)) shown in the figure have been obtained by processing an ordinary pulp in a refiner to obtain cellulose fibers, which were then processed in a jet mill three to four times to obtain the cellulose nanofibers. The cellulose nanofibers have an average fiber width of 0.069 μm.

The XRD patterns and the FT-IR spectra of the obtained porous bodies are shown in FIGS. 3 and 4, respectively. These figures indicate that the ceramics in the present experiment are β-TCP, and not hydroxyapatite.

SEM images of the obtained porous bodies are shown in FIGS. 5 to 8, and the physical properties of the obtained porous bodies (Test Examples 1 to 6) are shown in Table 1. FIG. 5(1) shows the porous body wherein 1 ml of BT-7 was added. FIG. 5(2) shows the porous body wherein 2 ml of BT-7 were added. FIG. 5(3) shows the porous body wherein 3 ml of BT-7 were added. FIG. 6(1) shows the porous body wherein 4 ml of BT-7 were added. FIG. 6(2) shows the porous body wherein no BT-7 was added. FIG. 6(3) shows the porous body wherein no cellulose fibers were added but 4 ml of BT-7 were added.

The SEM images shown in FIGS. 7(1) to 7(3) correspond to Test Examples 1 to 3, respectively. Similarly, the SEM images shown in FIGS. 8(1) to 8(3) correspond to Test Examples 4 to 6, respectively.

TABLE 1

| | CNF g | BT-7 | PAA concentration % | Porosity (1) % | Open porosity (2) % | Percentage of open pores in pores (2)/(1) × 100 % | Closed porosity (3) % | Percentage of closed pores in pores (3)/(1) × 100 % | Bulk density g/cm$^3$ | Average pore size μm |
|---|---|---|---|---|---|---|---|---|---|---|
| Test Example 1 | 30 | 1 | 30 | 69.2 | 66.3 | 95.8 | 2.9 | 4.2 | 0.95 | 397 |
| Test Example 2 | 30 | 2 | 30 | 74.5 | 70.2 | 94.2 | 4.3 | 5.8 | 0.78 | 329 |
| Test Example 3 | 30 | 3 | 30 | 73.4 | 68.5 | 93.3 | 4.9 | 6.7 | 0.82 | 285 |
| Test Example 4 | 30 | 4 | 30 | 75.7 | 75.1 | 99.2 | 0.6 | 0.8 | 0.74 | 223 |
| Test Example 5 | 30 | 0 | 30 | 47.2 | 47.1 | 99.8 | 0.1 | 0.2 | 1.62 | 70 |
| Test Example 6 | 0 | 4 | 30 | 76.5 | 69.4 | 90.7 | 7.1 | 9.3 | 0.72 | 170 |

The results above demonstrate that with the increase in the amount of the foaming agent (BT-7) added, the average pore size of the pores becomes smaller. Accordingly, it is assumed that a plurality of types of pores with various pore sizes may be formed by using the cellulose nanofibers as the foaming aid and by changing the amount of the foaming agent. Incidentally, the result seen from the SEM image in FIG. 11 indicates that the addition of the cellulose nanofibers did not significantly affect the shape of the pores formed in the dried product, compared to the case where the foaming aid was not added.

Experiment 2

Next, a foam height test was conducted. In this test, the entire amount of the above-mentioned second mixture (foamed body) obtained by adding 4 ml (3.80 g) of BT-7 was placed in a graduated cylinder and left to stand, and the height of the foam was measured with the lapse of time. The results are shown in FIGS. 9 and 10. FIGS. 9(1) and 9(2) show the second mixture without the cellulose nanofibers added, whereas FIGS. 9(3) and 9(4) show the second mixture with the cellulose nanofibers added. FIGS. 9(1) and 9(3) show the state at 0 minute, whereas FIGS. 9(2) and 9(4) show the state at 60 minutes. In FIG. 10, the time lapse is plotted on the abscissa and the foam height is plotted on the ordinate. At 0 minute, the foam heights in FIGS. 9(1) and 9(3) were both 168 mm. The foamed body 40 containing the cellulose nanofibers substantially maintained the foam height even after the lapse of 60 minutes. On the other hand, the foamed body 50 without the cellulose nanofibers exhibited a reduced foam surface height with the lapse of time.

The above results demonstrate that the cellulose nanofibers constrain the foam breaking to promote maintenance of the foam.

Experiment 3

Porous ceramics (porous bodies) were produced from the β-TCP powders and cellulose nanofibers (CNF), and the open porosity, closed porosity, and bulk density of the obtained porous body were measured for each porous body. In this experiment, the amount of the foaming aid was varied. The details are discussed below.

(Synthesis of β-TCP Powders)

β-TCP powders were synthesized in the same way as in Experiment 1.

(Production of Porous Body)

Thirty grams of the β-TCP powders thus obtained and cellulose nanofibers were mixed, to which 30 ml of a 30% aqueous solution of ammonium polyacrylate (PAA) were added, and mixed under ultrasonic irradiation for five minutes using a hand blender (multi hand blender) to obtain a first mixture. Then, 4 ml (3.80 g) of a foaming agent (polyoxyethylene alkyl ether) was added to the first mixture, and mixed again under ultrasonic irradiation for five minutes using the multi hand blender to obtain a second mixture (foamed body). Here, various amounts of the cellulose nanofibers, 10 g, 20 g, 30 g, or 0 g, were used. The foaming agent used here was NIKKOL BT-7 manufactured by NIKKO CHEMICALS CO., LTD. Then, each second mixture (foamed body) was placed in a rectangular crucible and tapped (sample shape: 60 mm×60 mm×tapping height 25 mm). By this tapping, foam was adequately broken. Then, the tapped mixture was dried at 40° C. for 72 hours. The resulting dried product was subjected to four-step sintering. This sintering was carried out at 180° C. (first temperature) for 4 hours, at 300° C. (second temperature) for 4 hours, at 400° C. (third temperature) for 4 hours, then at 1000° C. for 40 minutes, and then the temperature was lowered by 5° C. per minute down to ordinary temperature. The rate of temperature increase up to each subsequent step was 5° C. per minute.

Each porous body thus obtained was equally divided (cut) into three sections along the height without turning over the porous body per se, and each section was referred to from the top downwards as the porous body upper section, porous body middle section, or porous body lower section.

The cellulose nanofibers used in Experiment 3 were the same as those in Experiment 1.

SEM images of the obtained porous bodies are shown in FIGS. 12 to 15, and the physical properties of the obtained porous bodies (Test Examples 7 to 10) are shown in Table 2. FIG. 12 shows images of the porous body containing 10 g of the cellulose nanofibers produced in Test Example 7, wherein FIG. 12(1) is a SEM image of the porous body upper section, FIG. 12(2) is a SEM image of the porous body middle section, and FIG. 12(3) is a SEM image of the porous body lower section.

TABLE 2

|  | CNF g | BT-7 ml | PAA concentration % | Porosity (1) % | Open porosity (2) % | Percentage of open pores in pores (2)/(1) × 100 % | Closed porosity (3) % | Percentage of closed pores in pores (3)/(1) × 100 % | Bulk density g/cm³ |
|---|---|---|---|---|---|---|---|---|---|
| Test Example 7 | 10 | 4 | 30 | 75.1 | 72.9 | 97.1 | 2.2 | 2.9 | 0.76 |
| Test Example 8 | 20 | 4 | 30 | 74.7 | 69.8 | 93.4 | 4.9 | 6.6 | 0.78 |
| Test Example 9 | 30 | 4 | 30 | 75.7 | 75.1 | 99.2 | 0.6 | 0.8 | 0.74 |
| Test Example 10 | 0 | 4 | 30 | 76.5 | 69.4 | 90.7 | 7.1 | 9.3 | 0.72 |

FIG. 13 shows images of the porous body containing 20 g of the cellulose nanofibers and produced in Test Example 8, wherein FIG. 13(1) is a SEM image of the porous body upper section, FIG. 13(2) is a SEM image of the porous body middle section, and FIG. 13(3) is a SEM image of the porous body lower section.

FIG. 14 shows images of the porous body containing 30 g of the cellulose nanofibers and produced in Test Example 9, wherein FIG. 14(1) is a SEM image of the porous body upper section, FIG. 14(2) is a SEM image of the porous body middle section, and FIG. 14(3) is a SEM image of the porous body lower section.

In Test Example 7, pores (particularly, pores of relatively large diameters, i.e., large pores) are distributed substantially uniformly in each of the porous body upper section, the porous body middle section, and the porous body lower section. Further, it is seen from Test Example 7 that the pores (particularly, pores of relatively large diameters, i.e., large pores) are not significantly fewer in the porous body lower portion than in the porous body upper portion, or in the porous body lower portion than in the porous body middle portion. The same is also seen from the porous body upper portion, the porous body middle portion, and the porous body lower portion of each of Test Examples 8 and 9.

Comparing Test Examples 7 and 9, the pores of relatively large diameters observed in Test Example 7 are observed less in Test Example 9 than in Test Example 7.

INDUSTRIAL APPLICABILITY

The present invention is applicable to porous ceramics which may be used as a bone substitute material or the like.

The invention claimed is:

1. A method for producing porous ceramics, comprising:
   mixing a ceramic raw material and a foaming aid to obtain a mixture,
   adding a foaming agent to the mixture to form a foamed body, and
   sintering the foamed body to obtain ceramics having pores,
   wherein the foaming aid is at least one of cellulose fibers having an average fiber width of 0.5 to 50 μm and cellulose nanofibers,
   wherein the pores include open pores and closed pores, the open pores including a plurality of large-diameter open pores having a pore size within a range of 20 to 600 μm and a plurality of micro-diameter open pores having a pore size within a range of 1.0 μm or smaller, and
   wherein the open pores account for 80% or more of the pores.

2. The method for producing porous ceramics according to claim 1,
   wherein the mixture is obtained by mixing 100 parts by mass of the ceramic raw material and 1 to 200 parts by mass of the foaming aid.

* * * * *